No. 644,747. Patented Mar. 6, 1900.
C. F. SHUMAKER.
ROASTING MACHINE.
(Application filed May 6, 1897.)
(No Model.) 2 Sheets—Sheet 1.
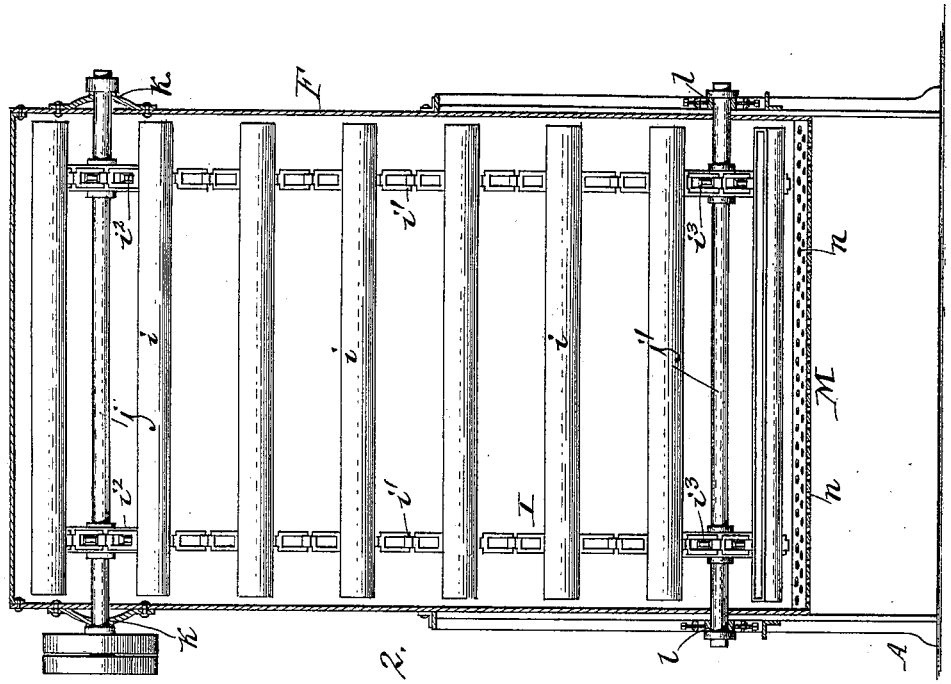
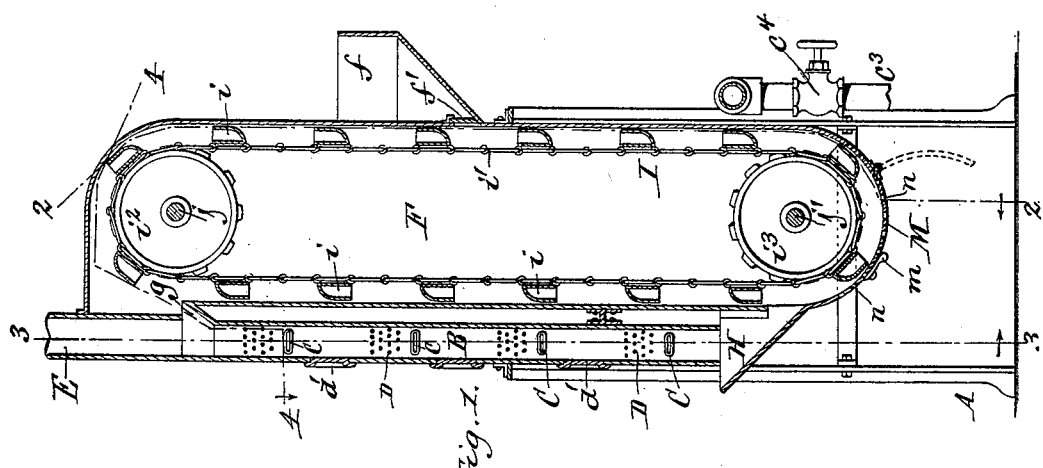
Witnesses:
Ernest Pulsford.
F. Gustav Wilhelm.
Chas. F. Shumaker Inventor.
By Wilhelm Bonner
Attorneys
THE NORRIS PETERS CO., PHOTO-LITHO., WASHINGTON, D. C.

No. 644,747. Patented Mar. 6, 1900.
C. F. SHUMAKER.
ROASTING MACHINE.
(Application filed May 6, 1897.)
(No Model.) 2 Sheets—Sheet 2.
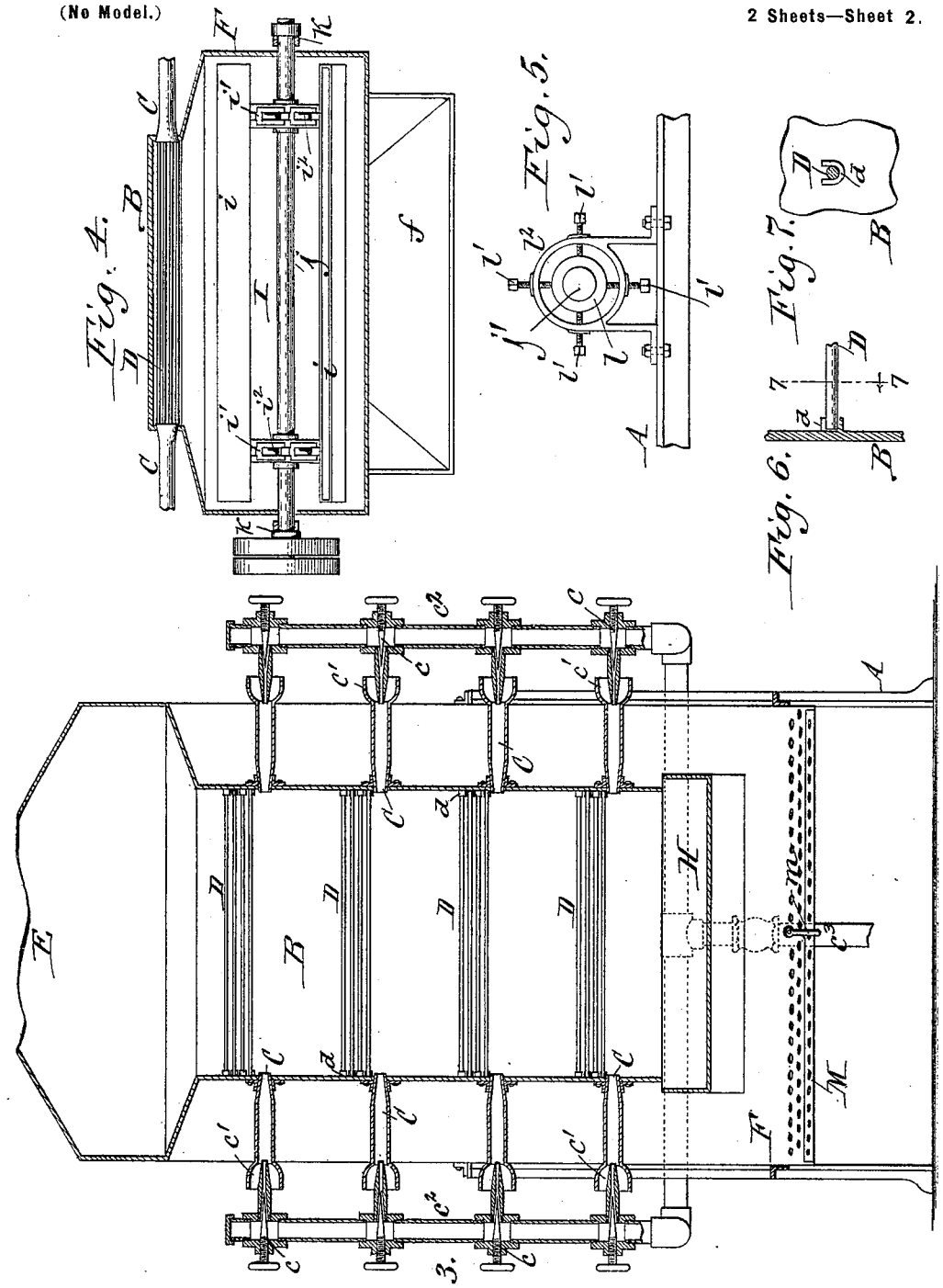

UNITED STATES PATENT OFFICE.

CHARLES F. SHUMAKER, OF SILVER CREEK, NEW YORK.

ROASTING-MACHINE.

SPECIFICATION forming part of Letters Patent No. 644,747, dated March 6, 1900.

Application filed May 6, 1897. Serial No. 635,374. (No model.)

*To all whom it may concern:*

Be it known that I, CHARLES F. SHUMAKER, a citizen of the United States, residing at Silver Creek, in the county of Chautauqua and State of New York, have invented a new and useful Improvement in Roasting-Machines, of which the following is a specification.

This invention relates to a roasting-machine which is particularly designed for roasting coffee, but may also be used for roasting cereals, &c.

My invention has for its object to produce a simple and efficient machine for this purpose whereby the coffee or other material can be roasted uniformly and expeditiously.

In the accompanying drawings, consisting of two sheets, Figure 1 is a vertical transverse section of my improved roasting-machine. Figs. 2 and 3 are vertical transverse sections of the machine in lines 2 2 and 3 3, Fig. 1, respectively, looking in opposite directions. Fig. 4 is a horizontal section in line 4 4, Fig. 1. Fig. 5 is a fragmentary side elevation, on an enlarged scale, of one of the bearings of the lower elevator-shaft. Fig. 6 is a fragmentary vertical longitudinal section, on an enlarged scale, of a portion of the roasting-chamber, showing one of the sockets for supporting the retarding and spreading rods. Fig. 7 is a fragmentary cross-section in line 7 7, Fig. 6.

Like letters of reference refer to like parts in the several figures.

A represents the main frame of the machine, which may be of any suitable construction.

B represents a vertical roasting-chamber which is arranged on the rear portion of the frame and which is comparatively long and narrow. The roasting-chamber is open at its upper and lower ends, the coffee or other material being introduced into the chamber at its upper end and discharged therefrom at its lower end.

C represents gas-burners whereby flames are thrown across the roasting-chamber for roasting the coffee as the latter drops through the chamber. A number of these burners project through each of the narrow end walls of the roasting-chamber, preferably four on each side, as shown in Figs. 1 and 3. The nozzle of each burner is flattened vertically at its outlet, so that the flame is spread out horizontally into a wide sheet. Each of the burners on one side of the roasting-chamber is horizontally in line with a companion burner on the opposite side of the chamber, and the length of the roasting-chamber is such that the flames of each pair of burners practically meet in the center of the chamber, thereby forming several sheets of flame across the chamber, one below the other, through which the coffee passes successively while falling through the chamber and whereby the coffee is uniformly roasted. Each burner is provided with a regulating-valve $c$ and an air-mixer $c'$ of well-known construction, and the burners on the same side of the roasting-chamber are connected by a manifold pipe $c^2$ with the main supply-pipe $c^3$, containing a main valve $c^4$.

D represents horizontal retarding and spreading rods which are arranged lengthwise in the roasting-chamber and which serve to retard the descent of the coffee through the same and also spread the coffee, so that each bean is acted upon by the flame on all sides. A set of these rods is arranged above each pair of burners, and each set consists of a number of horizontal rows, the rods in each row being arranged opposite the spaces between the rods in the row above the same, so that the coffee-beans which do not strike the upper row of rods will strike the rods of the next lower row, thereby insuring a slow movement of the coffee through the chamber and agitating and turning the beans. Each of the rods is seated loosely with its ends in seats or pockets $d$ $d$, which are formed on the inner sides of the end walls of the chamber, so that the rods can be readily replaced when they become worn or burned out. For convenience in introducing and removing the rods the rear side of the roasting-chamber is provided with a number of hand-holes which are closed by doors or covers $d'$ when the machine is in operation.

During the operation of roasting the coffee fresh air is admitted through the lower open end of the roasting-chamber and the smoke and gases are carried off by a chimney E, which communicates with the upper end of the roasting-chamber.

After the coffee is discharged from the lower end of the roasting-chamber it is again elevated into the top of the chamber for repeating the roasting operation by means of an elevator, which is preferably constructed as follows:

F represents an upright elevator case or chamber which is arranged in front of the roasting-chamber and which has its lower end or bottom raised from the ground or floor, so as to leave a free space below the same. The coffee is introduced into the elevator-case by a feed-hopper $f$, which opens into the front side of the case about midway of its height and which is provided with a slide-valve $f'$ for controlling the outlet of the hopper. The upper rear portion of the elevator-case is connected with the upper end of the roasting-chamber by a chute $g$.

H represents a return-hopper which is arranged below the lower or outlet end of the roasting-chamber, so as to receive the coffee as it discharges from the chamber and which opens with its outlet into the lower front portion of the elevator-chamber.

I represents an elevator whereby the coffee is raised from the bottom of the elevator-case to the top of the roasting-chamber. This elevator consists, preferably, of buckets $i$, secured to vertical chain belts $i'$, which pass around sprocket-wheels $i^2$ $i^3$, mounted, respectively, on upper and lower shafts $j\ j'$. The upper shaft $j$ is journaled in bearings on the upper portion of the elevator-case. The lower shaft $j'$ is journaled in bearings $l\ l$, each of which is adjustably mounted on the lower portion of the main frame by four radial equidistant screws $l'$, arranged in a bracket $l^2$ on the frame and engaging with the bearing.

Preparatory to starting the machine a batch of coffee is introduced into the elevator-casing through the feed-spout. When the machine is in operation, the coffee is raised continually in small batches by the elevator-buckets from the bottom of the case to the top of the roasting-chamber, through which it falls and in which it is acted on by the flame and from which it is returned to the bottom of the elevator-case. The coffee is circulated in this manner through the roasting and elevating chambers, the roasting operation progressing every time the coffee passes through the flames in the roasting-chamber. The progress of the roasting operation can be observed by taking a sample occasionally from the coffee as it discharges from the roasting-chamber into the return-hopper. The bottom of the elevator-case is provided with a movable section M, covering a discharge-opening through which the finished roasted coffee is discharged into a receptacle placed below said opening. This section is hinged to the case and fastened by a turn-button $m$.

The bottom of the elevator-case and the discharge-door are provided with perforations $n$, through which dust, hulls, and shells which are detached from the coffee or other material during the roasting operation are permitted to escape from the case and fall upon the floor or into a receptacle placed under the elevator-case.

I claim as my invention—

1. The combination with an upright roasting-chamber having at its upper end an inlet for the material to be roasted and an outlet at its bottom, of a burner opening into the side of the roasting-chamber and projecting a flame across the same, and a cluster of horizontal retarding-rods arranged at different elevations above the burner, whereby the coffee-beans are retarded, distributed, and turned over in falling from one rod to the other, substantially as set forth.

2. The combination with an upright roasting-chamber having at its upper end an inlet for the material to be roasted and an outlet at its bottom, of a series of burners opening at different elevations into the side of the roasting-chamber and each elongated horizontally to project a sheet of flame into the chamber which practically covers the width of the chamber, and retarders arranged in the chamber above the burners for retarding, distributing and turning the coffee-beans in falling from one sheet of flame to the other, substantially as set forth.

3. The combination with an upright roasting-chamber having at its upper end an inlet for the material to be roasted and an outlet at its bottom, of a series of burners opening at different elevations into the side of the roasting-chamber and projecting flames across the same, retarders arranged in the chamber above the burners, and an elevator arranged adjacent to said chamber and receiving the material from the bottom of the roasting-chamber and delivering it to the top thereof, substantially as set forth.

4. The combination with an upright roasting-chamber having an inlet at its upper end and an outlet at its lower end, of a burner opening into the side of said chamber and projecting a flame across the same, and horizontal retarding-rods removably supported in said chamber above the burner, substantially as set forth.

5. The combination with an upright roasting-chamber having an inlet at its upper end and an outlet at its lower end, of a burner opening into the side of said chamber and projecting a flame across the same, open sockets secured to the inner side of said chamber above the burner, and horizontal retarding-rods loosely resting in said sockets, substantially as set forth.

Witness my hand this 14th day of April, 1897.

CHARLES F. SHUMAKER.

Witnesses:
FRANK P. STEWART,
C. L. BROWN.